April 28, 1931. E. G. FAHLMAN 1,803,299
MOLD
Filed Jan. 31, 1929 5 Sheets-Sheet 2

INVENTOR
E. G. Fahlman
BY
Evans & McCoy
ATTORNEYS

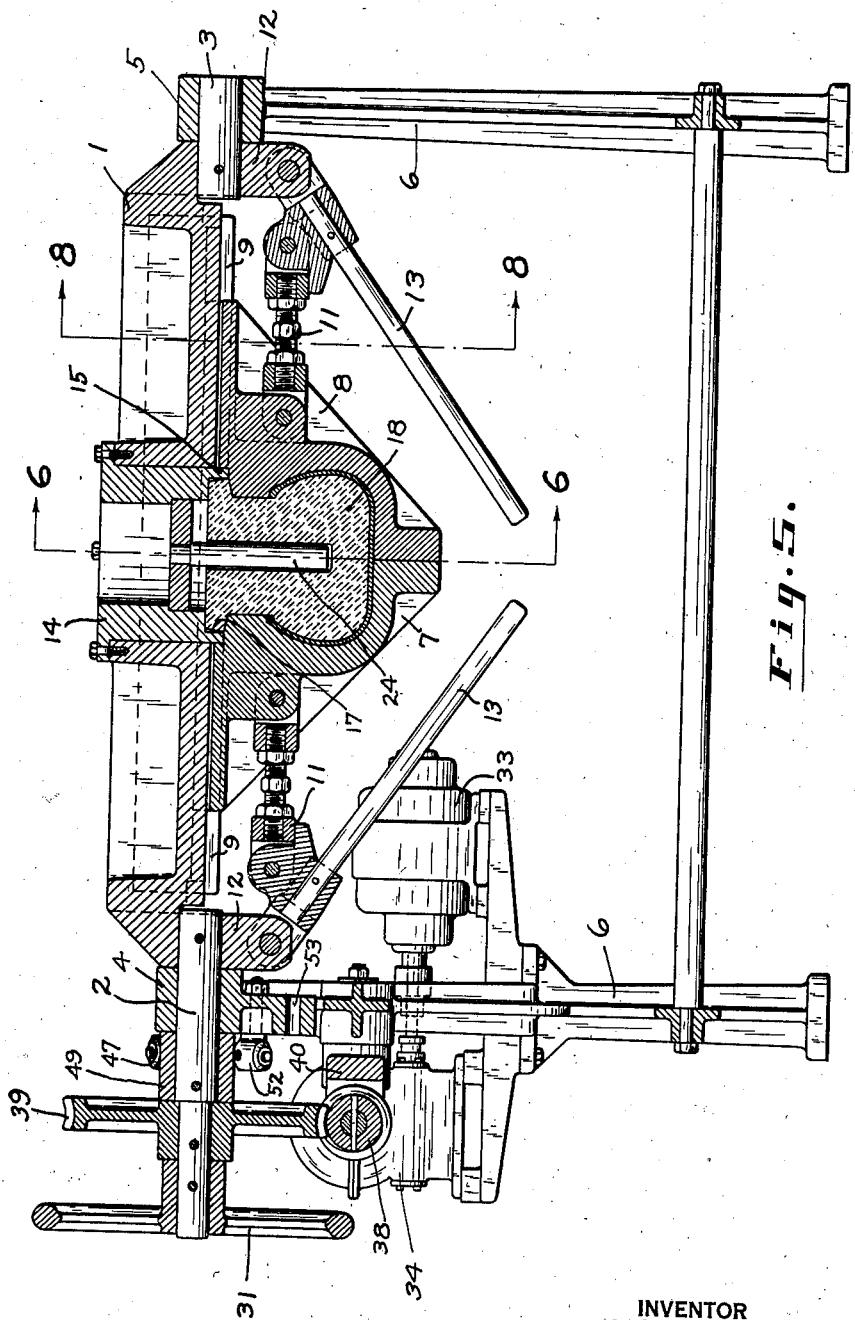

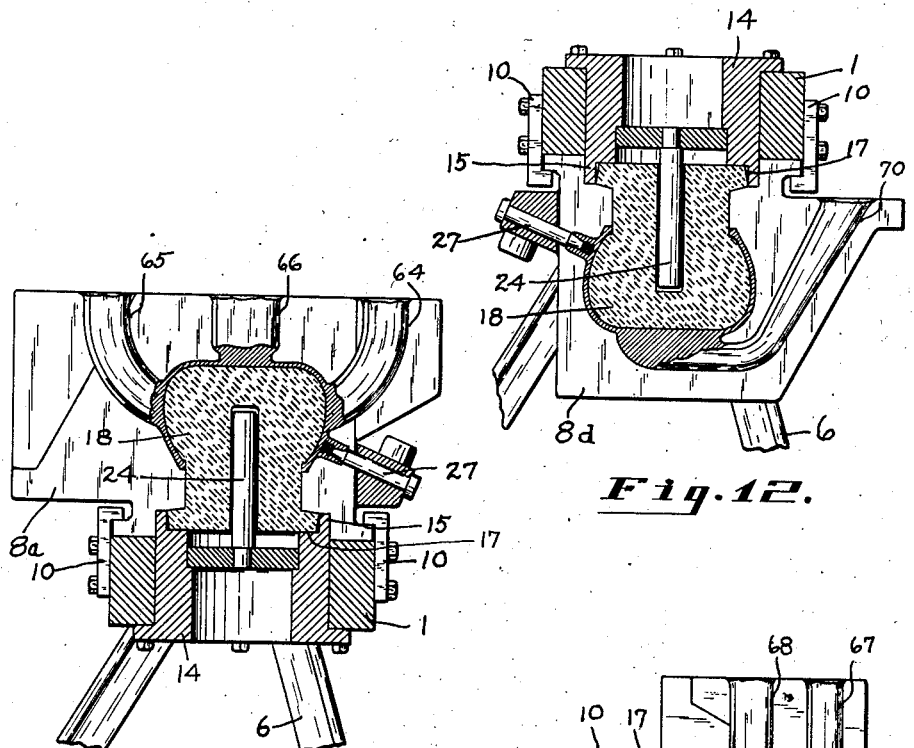
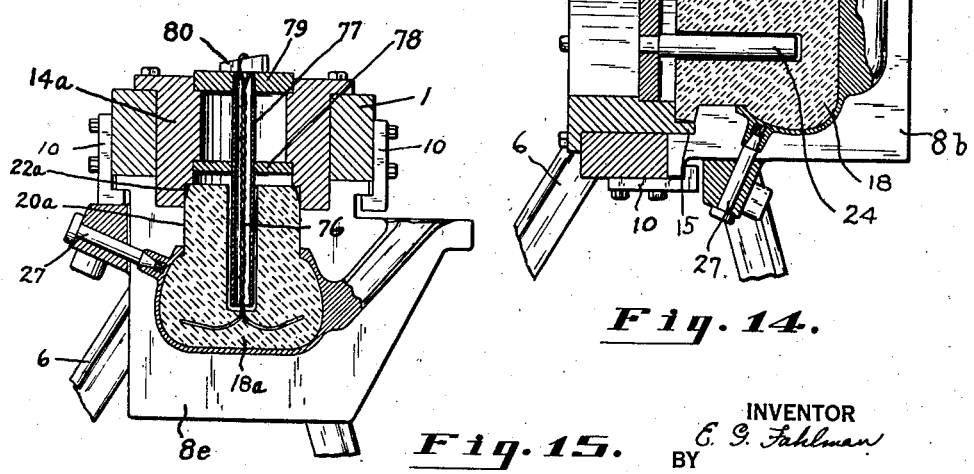

Patented Apr. 28, 1931

1,803,299

UNITED STATES PATENT OFFICE

EVERETT G. FAHLMAN, OF CLEVELAND, OHIO, ASSIGNOR TO THE PERMOLD COMPANY, OF CLEVELAND, OHIO, A CORPORATION OF OHIO

MOLD

Application filed January 31, 1929. Serial No. 336,360.

This invention relates to the casting art and more particularly to an advantageous permanent mold for use in said art.

An object of this invention is to provide mold structure apparatus which may be assembled in a convenient position and rotated to another position for the casting operation. Another object is to provide advantageous mold apparatus for casting recessed articles. A further object is to provide a permanent mold with which may be associated a frangible core for use in forming recessed castings. Another object is to provide an improved permanent mold suitable for casting aluminum alloys.

Other objects will be apparent to those skilled in the art from the disclosure herein made and from the accompanying drawings wherein:

Fig. 5 is a vertical longitudinal sectional view through the mold apparatus shown in Fig. 1, the mold base and movable mold sections being shown as in inverted position with a core in place;

Fig. 12 is a vertical sectional view similar to Fig. 6 showing a modified form of sprue cavity connection with the casting cavity, the mold being shown tilted one hundred and eighty degrees (180°) from the position shown in Fig. 1, for the casting operation;

Fig. 13 is a sectional view similar to Fig. 6, showing another modified form of sprue and riser cavity connection with the casting cavity, the mold being shown in upright position for the casting operation;

Fig. 14 is a sectional view showing still another modified form of sprue and riser cavity connection with the casting cavity, the mold being shown tilted ninety degrees (90°) from the position shown in Fig. 1, for the casting operation; and Fig. 15 is a sectional view similar to Fig. 6 illustrating a modified form of core and core support.

Figure 1:
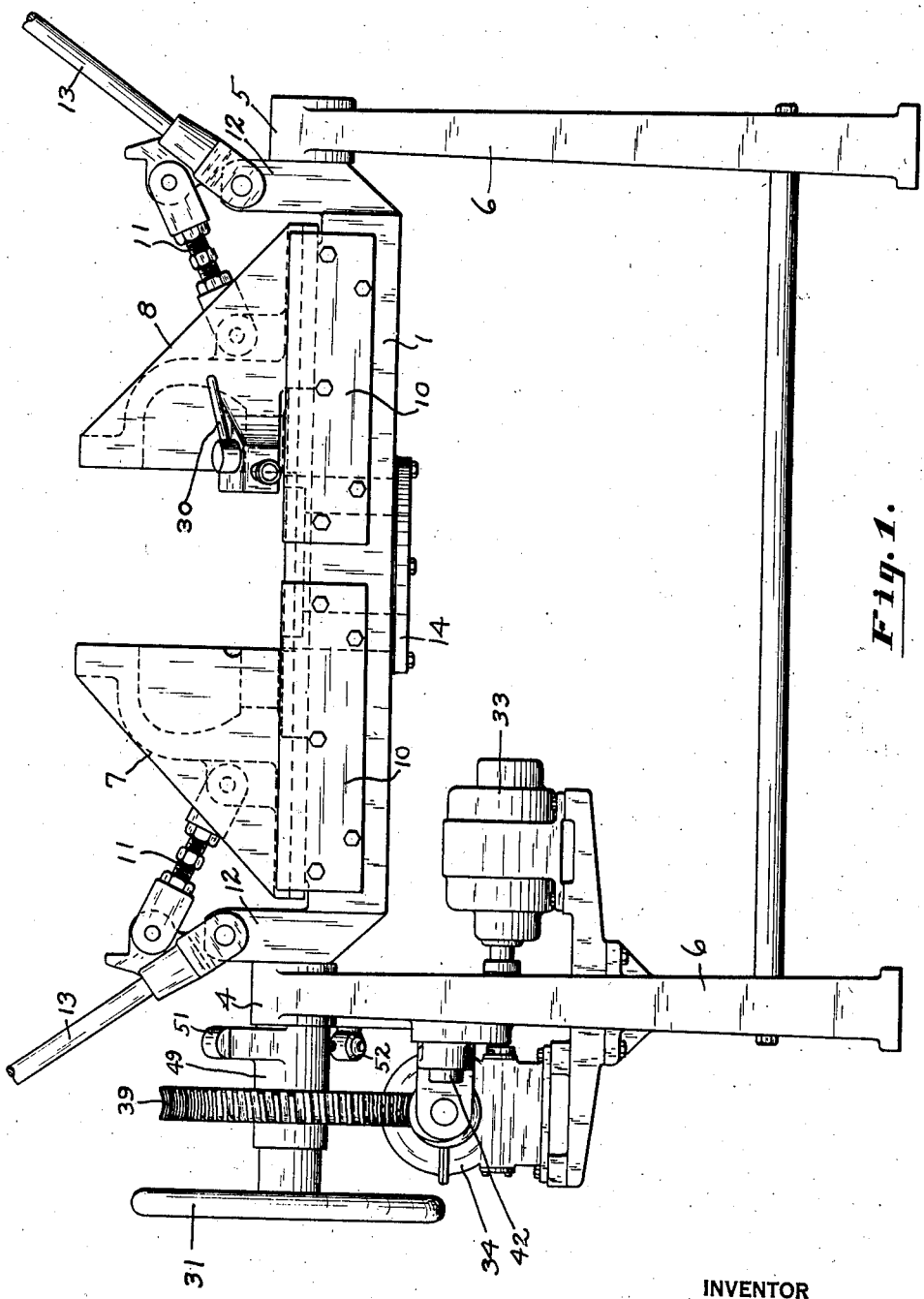
Figure 1 is a front elevation of mold apparatus contemplated by my invention, the movable mold sections being shown in separated position.

In casting hollow articles it frequently happens that it is convenient to associate a core and cooperating mold parts in one position and to pour the casting in another. I have thus provided mold apparatus with which a core may be associated, and which apparatus may be assembled in a given convenient position, after which the mold may be rotated through any desired angle whereby the castings may be poured with the mold in the most advantageous position for casting. The core and mold parts are arranged to cooperate during such rotation or tilting in order to maintain the core in desired position. To remove the casting the mold may be rotated back to normal position and disassembled.

Molds according to this invention may be mounted on a turntable or other conveyor for automatic or manual operation, or they may be mounted upon individual supports as illustrated. Moreover, the mold sections may embody sand as the molding material, and the core may be of metal or other "permanent" material as well as or sand.

The rotation or tilting of the mold may be accomplished manually or by mechanical means. I have shown the mold apparatus as arranged for the casting of a hollow aluminum cooking utensil but it is obvious that my invention may be applied to the casting of a wide variety of articles of various shapes and sizes. Moreover, the movable mold sections may be interchanged so that castings of various sizes and shapes may be formed by the same mold apparatus.

In the drawings, the mold apparatus is shown as comprising a rotatable mold base 1 carrying the horizontal trunnions 2 and 3 which are supported in the bearings 4 and 5 of the supporting frame 6. Slidable on the upper surface of the mold base 1 are the mold sections 7 and 8 which are guided by the longitudinal guide 9 and also by the side guides 10 which serve to hold the said mold sections in cooperation with the base 1 when the mold base is in a partly or completely inverted position. The mold sections 7 and 8 may be moved along the base 1 by the adjustable toggle connections 11 cooperating with the mold sections 7 and 8 and the boss portions of the base 1. The toggle connections 11 may be operated by suitable handles 13. As will be seen from the toggle structures illustrated, the mold sections are locked in position when brought into closed position.

A bushing 14 is shown as disposed within a substantially central aperture in the mold base 1 and as secured to said base, said bushing extending above the mold base at 15 to cooperate with the mold sections 7 and 8. The bushing 14 is shown as shaped at its upper portion to form a seat 17 whereby a frangible sand core 18 may be readily positioned accurately with respect to the mold base and the mold sections.

Figure 11:
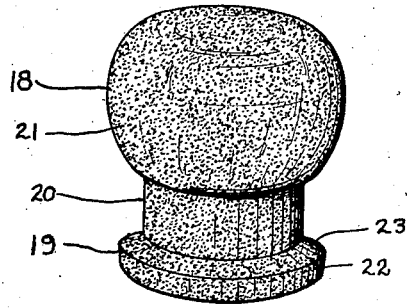
Fig. 11 is a perspective view of a frangible sand core which may be utilized with the mold apparatus illustrated.

The frangible core 18, which is preferably associated with the mold apparatus when the mold base is in upright position as indicated in Fig. 11, is shown as comprising a lower flange portion 19, a neck portion 20, and an upper portion 21 shaped to conform to the interior of the casting to be formed. The outer surface 22 of the lower flange portion 19 may be slightly tapered downwardly, as shown for example in Figs. 5 and 13, in order that the core may be more readily associated with or positioned upon the mold base 1. The upper surface 23 of the flange portion 19 and the surface of the neck portion 20 are shown as arranged to be engaged by the movable mold sections 7 and 8, whereby the core may be maintained rigidly in the desired position at any position of rotation of the mold base 1. The upper portion 21 of the core is arranged to cooperate with the mold sections to define a mold cavity of the desired shape and contour.

A central pin 24 which is shown as carried by the bushing 14 is shown as arranged to extend upwardly well into the frangible core 18 in order to prevent the sticking of the core or of the casting to either of the mold sections during the opening of the mold after the casting operation. The core is shown as suitably apertured to receive the pin 24.

In Fig. 15 I have illustrated a modified form of core 18a associated with the mold section 8e. The core 18a has a neck portion 20a, the lower portion of which may be tapered inwardly at 22a, the core having no lower flange portion. A wire 76 is imbedded in the core 18a and extends through the tube 77 supported by the members 78 and 79 in the bushing 14a. A wedge 80 extends through a loop in the wire 76 and assists in holding the core 18a in position. Where the mold sections are closely associated with the neck 20a of the core, the frictional contact thus obtained is also a factor in maintaining the core in desired position.

It will be understood, of course, that the core may be supported in any suitable manner, my invention not being limited to the particular forms illustrated in the drawings. For example, the core might be held in place merely by friction of the mold sections against vertical core surfaces. Or, pins might be arranged to extend laterally from the mold sections into the core. Other means for securing the core in place will be apparent to those skilled in the art.

Figure 7:
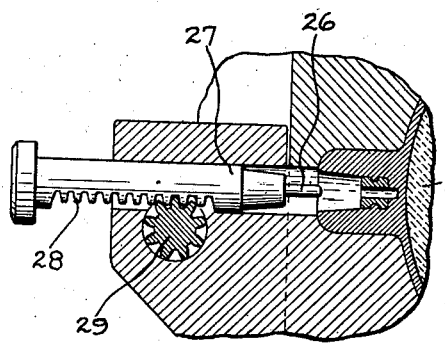
Fig. 7 is a sectional view taken on line 7—7 of Fig. 6.
Figure 10:
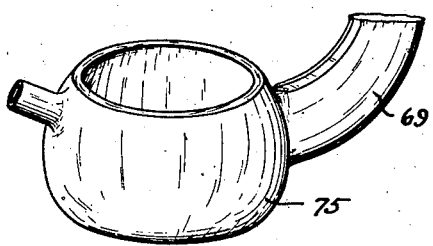
Fig. 10 is a perspective view of a casting with sprue attached formed in the mold illustrated in Fig. 6.

In certain cases, as in forming the handle of a pan or kettle 75 (Fig. 10), it may be desirable to form a nut or equivalent member in the casting, which nut may be employed to cooperate with a suitable handle (not shown). Thus in Fig. 7 is shown a core pin 26 upon which may be disposed a nut of brass or other suitable material, preferably of angular shape, around which nut the casting metal may be poured so that such nut may be secured in and form a part of a casting. The core pin 26 is carried by a core member 27 provided with rack teeth 28. The core member 27 may be moved into or out of the mold cavity by a pinion 29 operated by a handle 30 (Fig. 1).

The mold base 1 may be rotated manually or by suitable mechanical means. The manual rotation of the mold base 1 may be accomplished by rotating the hand wheel 31 secured to the outer end of the trunnion 2.

While various forms of mechanical devices may be employed for rotating the mold base mechanically, I have illustrated one form of such device. Thus, the supporting frame 6 is shown as carrying an electric motor 33, the speed of whose shaft is reduced by reducing gears within the gear box 34.

The gear box shaft 35 (Fig. 4) which is connected by a universal joint 36 to the shaft 37, rotates the worm 38 mounted on the shaft 37, which worm in turn rotates the worm wheel 39 keyed or otherwise secured to the trunnion 2. The bearing portions which support the worm 38 and shaft 37 are carried by the member 40, which is secured to the supporting frame 6 and which is arranged for pivotal movement about the bolt 41. The member 40 is secured at its other end to the supporting frame 6 by the pin 42 extending through the apertures 43 in the member 40, and either of the apertures 44 or 45 in the supporting frame.

Figure 2:
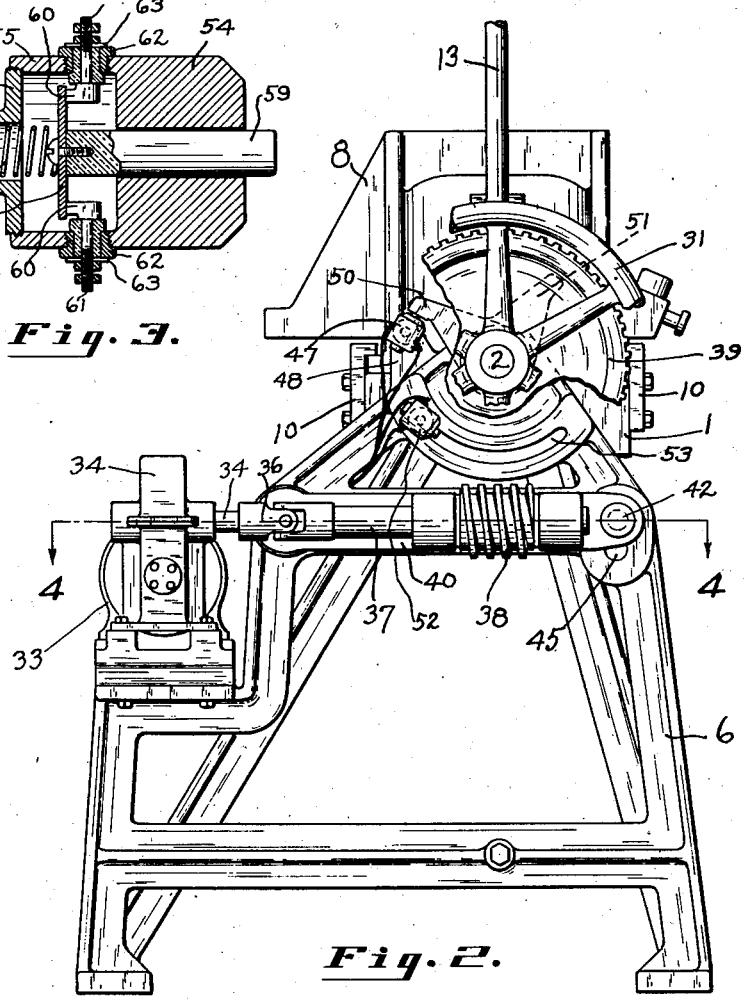
Fig. 2 is an end elevation, partly broken away, of the mold apparatus shown in Fig. 1.
Figure 4:
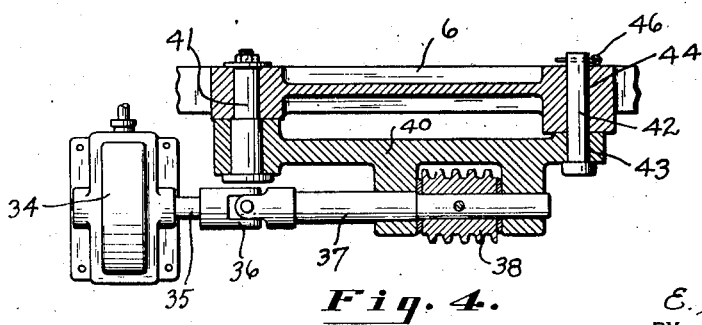
Fig. 4 is a horizontal sectional view taken on line 4—4 of Fig. 2.

The pin 42 may be retained in the desired position by any suitable means, such as the cotter pin 46 (Fig. 4). When the pin 46 is disposed in the upper aperture 44 the worm 38 will be retained in cooperative position with the worm wheel 39 (see Figs. 1, 2 and 5). To disconnect the mechanical mold-tilting means, the pin 42 may be removed from the upper aperture 44 and disposed in the lower aperture 45 in the supporting frame 6, whereby the worm 38 will be out of operative connection with the worm wheel 39, and the mechanical mold tilting means thus in operative position.

To tilt the mold to the desired degree I have provided suitable stops whereby the tilting of the mold in either direction may be limited and may be accomplished either manually or by the mechanical tilting means which I have shown. Thus, referring particularly to Figs. 1, 2, 3 and 5, I have shown a fixed stop 47 secured to the portion 48 of the supporting frame 6. A collar 49 secured to the trunnion 2 is shown as carrying a pair of contact arms 50 and 51, the arm 50 being arranged to contact with the stop 47. A second stop 52 is shown as adjustable in the circular slot 53 and is arranged to cooperate with the other contact arm 51. It will be seen that the fixed stop 47 and the contact arm 50 may be positioned so that the mold base may be disposed in an upright position for opening and closing the mold sections, inserting the frangible core and removing the finished casting. The movable stop member may be adjusted to any desired position, so that the mold may be tilted to any desired position for or during the casting operation.

Figure 3:
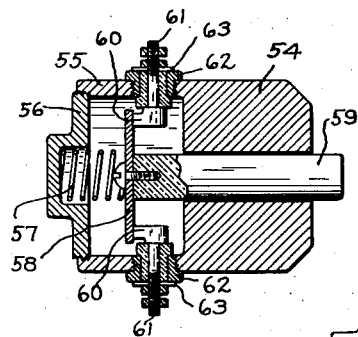
Fig. 3 is a longitudinal section through one of the stops used in connection with the rotation of the mold.

The interior construction of each of the stops 47 and 52 is similar and is illustrated in Fig. 3. Thus each stop may comprise a body 54 having a hollow portion 55 and a cap 56 secured to the open end of the body portion. A compressible spring 57 may be disposed against a depressed surface of the cap and an electrically conductive plate 58 carried by a plunger 59 of insulating material. The conductive plate 58 is arranged to contact with the members 60 secured to or forming a part of the terminals 61 which are insulated as by the bushings 62 and washers 63 from the body 54. When the plunger is depressed it will be seen that the electrical contact between the terminal members 60 will be broken. The terminals 61 may, of course, be suitably wired so that when the electrical connection between the terminals 61 is broken the motor 33 will be stopped and hence the rotative movement of the mold base 1 stopped. Thus, when the mold is rotating in either direction, said rotation will be stopped when either of the contact arms 50 or 51 depresses a plunger 59 of either of the stops 47 or 52. The body 54 further serves as a mechanical stop to resist further rotational movement of the mold. A suitable switch (not shown) may, of course, be used to start the motor 33 and initiate the rotation of the mold in the desired direction.

The stops 47 and 52 may, of course, be utilized with the manual rotation of the mold as well as with the mechanical rotation to limit the rotation of the mold in either direction.

The gating of the mold sections 7 and 8 and the location of sprues and risers will depend in part upon the pouring position of the mold. I have illustrated in the drawings various forms of gating and location of sprues and risers for use, depending upon the rotative position of the mold in which the casting is poured. It may be mentioned that the best casting position for a given casting may be determined by experiment and, furthermore, several casting positions may be equally suitable for forming a casting of given shape, size and contour.

In Fig. 13 I have illustrated a location of sprues and risers where the casting is to be formed without any tilting whatever, the sprue and riser cavities 64, 65 and 66 being provided in the mold sections 8a.

In Fig. 14 I have illustrated a construction for use where the mold is rotated ninety degrees for the casting operation, the sprue cavity 67 and riser cavity 68 being provided in the mold sections 8b.

Figure 6:
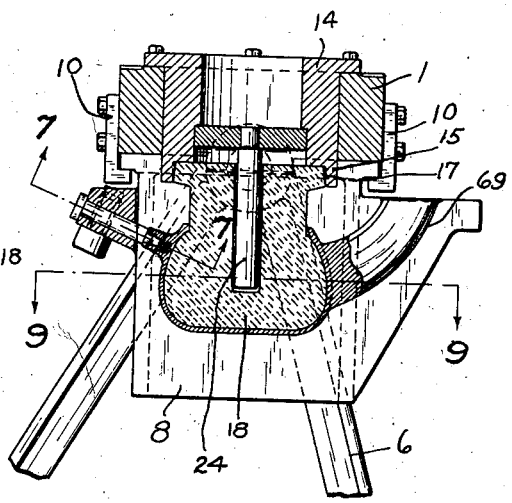
Fig. 6 is a vertical sectional view taken on line 6—6 of Fig. 5.
Figure 9:
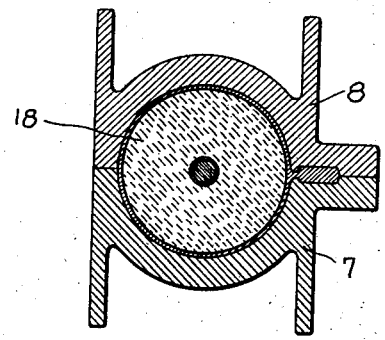
Fig. 9 is a horizontal sectional view taken on line 9—9 of Fig. 6.
Figure 8:
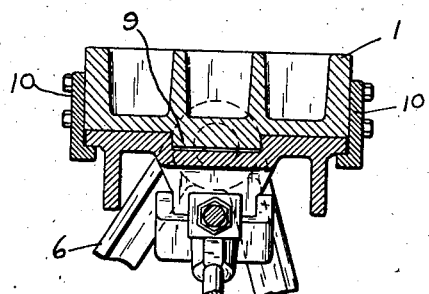
Fig. 8 is a vertical sectional view taken on line 8—8 of Fig. 5.

In Figs. 6 and 12 I have illustrated constructions for use where the mold is rotated one hundred and eighty degrees for the casting operation. In Fig. 6 the sprue cavity 69 in the mold sections 8 leads into the side of the casting cavity, while in Fig. 12 the sprue cavity 70 in the mold sections 8d leads into the bottom of the casting cavity.

In operation the mold base is first disposed in upright position substantially as shown in Fig. 1 and then a frangible core such as shown in Fig. 11 disposed in the seat 17 formed in the upper portion of the bushing 14. The mold sections 7 and 8 are then moved into closed position by the toggle constructions shown, at which time the mold base 1 may be rotated in a desired amount to the predetermined casting position. The molten metal is poured into the mold at the casting position. After a suitable period of cooling the mold may be returned to its upright position, at which time the mold sections may be separated and the casting removed.

It will be understood, of course, that the movable mold sections 7 and 8 may be interchanged with other mold sections suitably shaped to form any desired casting. In other words, by substitution of the movable mold sections 7 and 8, castings of any desired shape, size and contour may be formed in the casting apparatus herein disclosed.

It will be obvious that my improved mold apparatus may be rotated in various ways. Thus, the various mold parts may be assembled with the mold base in upright position as shown in Fig. 1, the mold parts then rotated through a predetermined angle, and the casting metal poured into the mold in such tilted position. In certain cases, however, it may be found desirable to pour the casting metal while the mold is being tilted. In such cases the mold members may be associated with the mold base in upright position, as shown in Fig. 1, tilting of the mold commenced, and the pouring operation carried out while the mold is being tilted.

It will thus be seen that I have provided an advantageous mold apparatus for forming castings, particularly recessed castings.

It will further be noted that I have provided an advantageous mold and core structure whereby said core may be readily associated with mold parts and moved into advantageous position for casting. It will also be seen that I have provided an improved advantageous mold apparatus whereby castings may be poured with the mold in any desired position of rotative adjustment.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A permanent mold arranged to be assembled in upright position, said mold comprising a mold base provided with trunnions, a support having bearing portions to cooperate with said trunnions, mold sections movable on said mold base, means carried by said mold base to support a core, said mold members and core cooperating to define a casting cavity, means for locking said mold sections in closed position, means for rotating said mold through a predetermined angle to molding position, and means for limiting the rotative movement of said mold.

2. A permanent mold arranged to be assembled in upright position, said mold comprising a mold base carrying trunnions, supporting means having bearing portions arranged to cooperate with said trunnions, movable mold sections mounted on said base, means for guiding the movement of said mold sections on said mold base, means for maintaining said mold sections in cooperative relation with said mold base during rotative movement of said base, adjustable stops to limit the rotative movement of said mold to a desired degree, mechanism actuated from a source of power for actuating said mold, means for stopping said mechanism when said mold has been rotated through the desired angle, means for disconnecting said rotating mechanism, and means for manually rotating said mold when said mechanism is disconnected.

3. A permanent mold comprising, in combination, a mold base carrying trunnions, a supporting frame having bearing portions arranged to cooperate with said trunnions, a pair of mold sections slidable on said mold base in a direction parallel with said trunnions, means for maintaining said mold sections in cooperative relation with said mold base and for guiding the movement of said mold sections on said mold base, toggle mechanism carried by said mold base for moving said mold sections on said mold base and for locking said mold sections in closed position, and means carried by one of said trunnions for manually rotating said mold base and mold sections.

4. A permanent mold comprising, in combination, a mold base carrying trunnions, a supporting frame having bearing portions arranged to cooperate with said trunnions, a plurality of mold sections movable on said mold base, means carried by said mold base for moving said mold sections thereon, means carried by said mold base for maintaining said mold sections in closed cooperative position during rotative movement of the mold base, means associated with one of said trunnions for rotating said mold base, means for rotating said mold base through a predetermined angle including a stop carried by said frame, and an arm carried by said mold base arranged to contact with said stop, said arm and stop being adjustable relative one to another to permit the desired amount of rotative movement of said mold base.

5. A permanent mold particularly adapted for the casting of aluminum alloys and the like comprising, in combination, a supporting frame, a mold base rotatably supported by said frame, a recessed member carried by said mold base arranged to support a frangible core, a pin carried by said recessed member arranged to extend upwardly into a recessed core, a frangible core arranged to cooperate with said recessed member, said core being recessed to receive said pin, said core recess and pin being arranged to prevent lateral movement of said core on said mold base, a plurality of permanent mold sections movable on said mold base into assembled position about said core, means carried by said mold base for maintaining said mold sections in assembled position, means associated with said mold for rotating said mold base and mold sections through a desired angle into casting position, whereby upon opening the mold after the casting operation the core and the casting will not stick to either or any of the mold sections, and whereby the casting may be readily removed from the mold.

6. A permanent mold particularly adapted for the casting of hollow articles from aluminum alloys and the like comprising, in combination, a supporting frame, a mold base rotatably carried by said supporting frame, a hollow bushing carried by said mold base and extending above the normal surface thereof, a pair of permanent mold sections slidable on said mold base, said mold sections being suitably recessed to cooperate with said upstanding bushing portions when in closed molding position, means for maintaining said mold sections in closed molding position during rotative movement of said mold base, said bushing being shaped to receive a recessed frangible core, a pin carried by said bushing arranged to extend into said core recess whereby appreciable lateral movement of said core may be prevented, and means for rotating said mold base and mold sections through a predetermined angle to an advantageous casting position whereby sticking of the casting to either mold section may be prevented during removal of the casting from the mold.

7. In a permanent mold adapted for casting substantially cup-shaped articles from aluminum alloys and the like, in combination, a mold base, a plurality of separable mold sections, means for guiding said mold sections into and out of predetermined molding position on said mold base, said mold sections having complemental recesses in their inner faces forming a substantially cup-shaped casting cavity opening downwardly, said mold base being recessed to receive a core, a frangible core arranged to be disposed in said mold base recess and shaped to fit snugly therein whereby said core may be disposed accurately in predetermined molding position, and additional means for preventing lateral movement of said core whereby after the casting operation the casting may be readily separated from the mold sections.

8. In a permanent mold for casting substantially cup-shaped articles from metal having a relatively high crystallization shrinkage and a relatively low freezing point, in combination, a support, a plurality of separable mold sections, means for guiding said mold sections into and out of predetermined molding position on said support, said mold sections having complemental recesses in their inner faces forming a substantially cup-shaped casting cavity opening downwardly, said mold base being recessed to receive a frangible core, a frangible core disposed in said recess in predetermined molding position, and means for preventing movement of said frangible core axially of the cup-shaped casting cavity, said mold base being mounted for rotative movement whereby the casting operation may be accomplished with the mold in a position in which the casting cavity may be readily filled with casting metal to form sound castings.

9. The method of readily forming substantially cup-shaped castings of advantageous characteristics from aluminum alloys and the like, which comprises disposing an inverted frangible core in predetermined position on a surface, assembling about said core metal mold parts to lock said core in position and to define an inverted cup-shaped casting cavity, inverting the assembled mold parts including said core to define a cup-shaped cavity opening upwardly, pouring casting metal into said casting cavity while the core is in said inverted position in which position the cup-shaped cavity opens upwardly, permitting the casting metal to solidify, and disassembling the mold parts and removing the casting.

10. The method of readily forming substantially cup-shaped castings of advantageous characteristics from aluminum alloys and the like, which comprises supporting an inverted frangible core in predetermined position, assembling metal mold parts about said core to lock said core in position and to define a cup-shaped casting cavity opening downwardly, tilting the assembled mold parts including said core to define a cup-shaped cavity opening upwardly, and commencing to pour casting metal into said casting cavity during the tilting of said mold, permitting the casting metal to solidify, and disassembling the mold parts and removing the casting.

In testimony whereof I affix my signature.
EVERETT G. FAHLMAN.